Nov. 27, 1928.
A. N. CRAMER
1,693,069
GLASS FORMING MACHINE
Filed Dec. 31, 1925    10 Sheets-Sheet 1
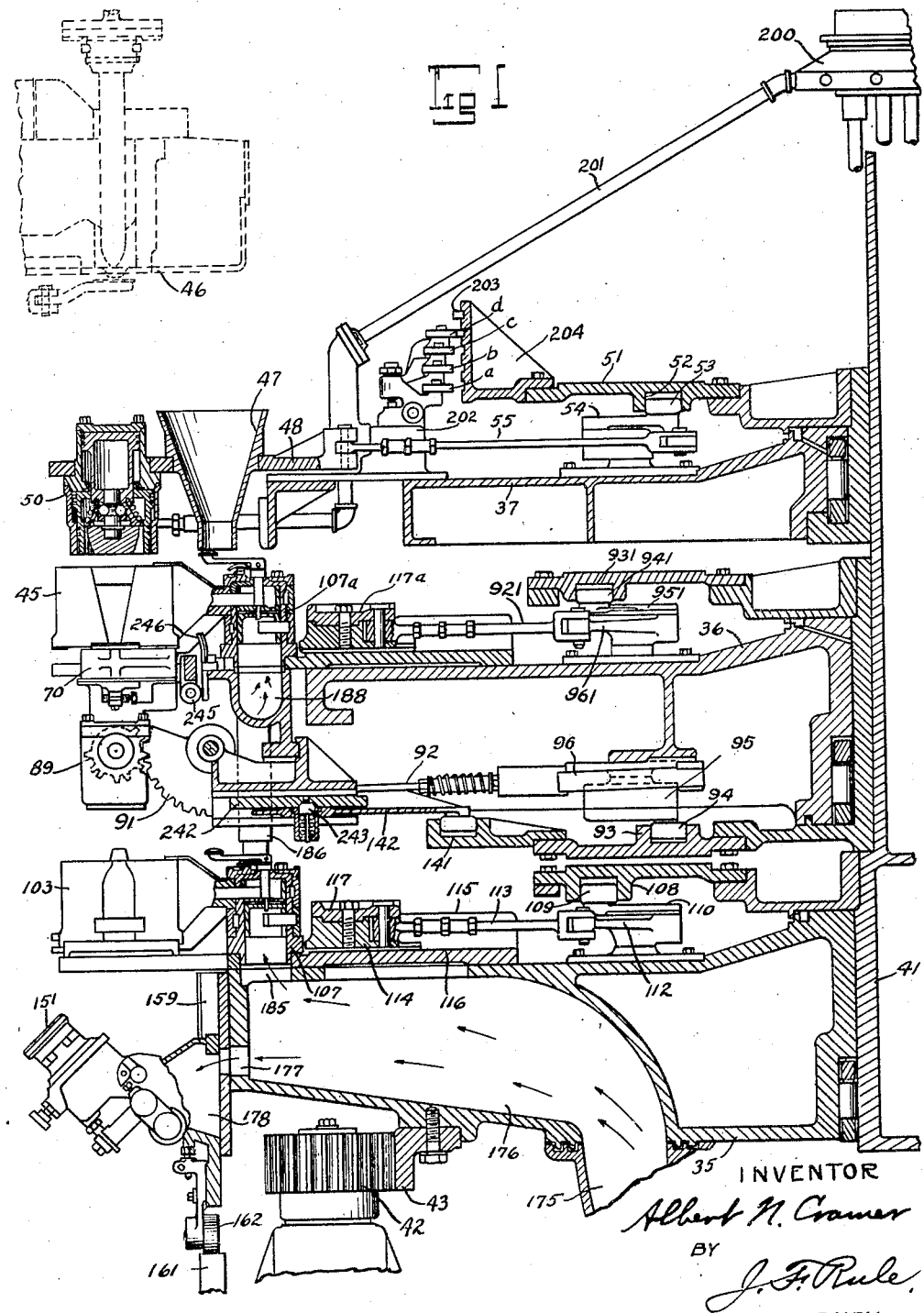
INVENTOR
Albert N. Cramer
BY
J. F. Rule
HIS ATTORNEY.

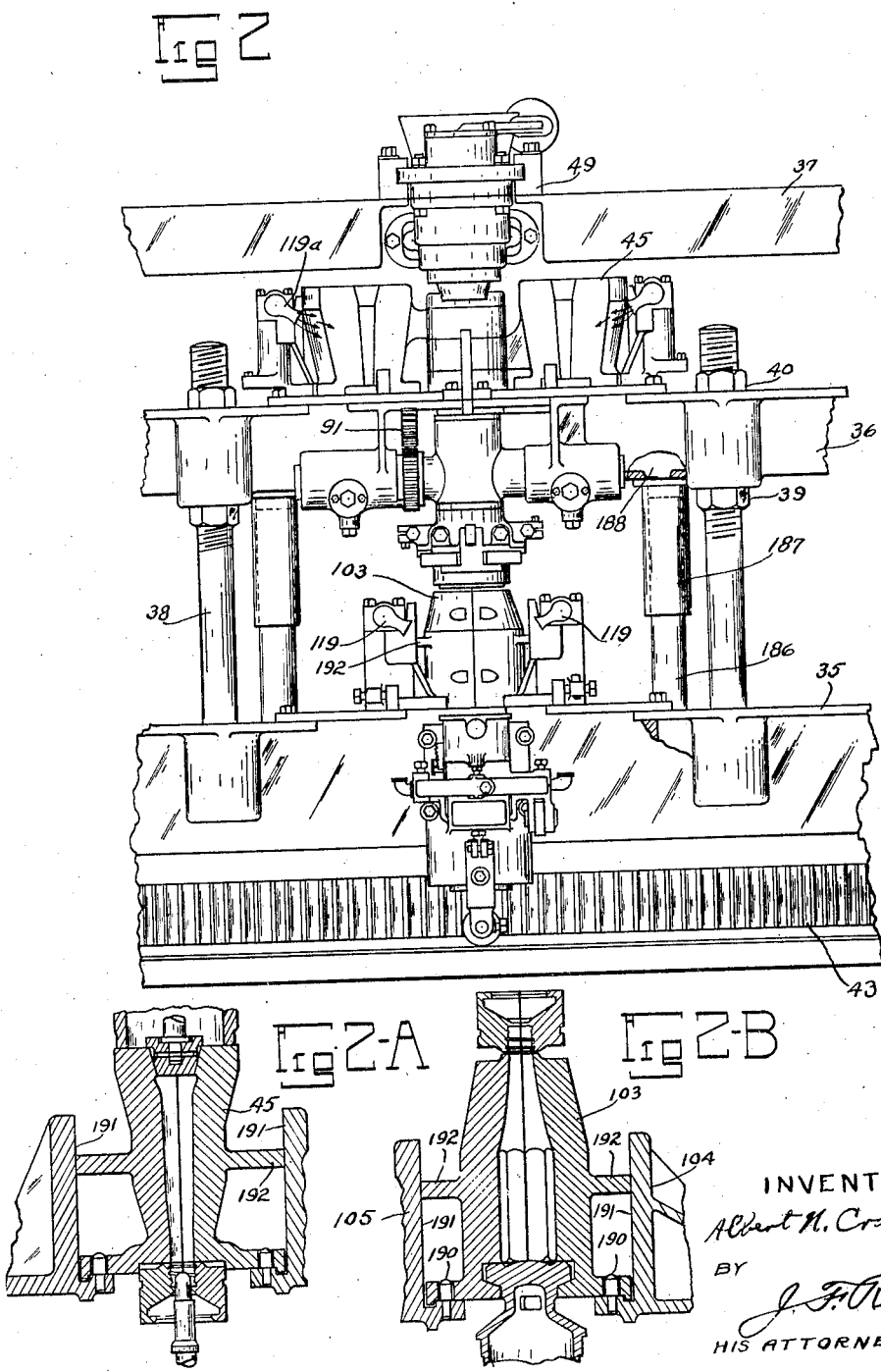

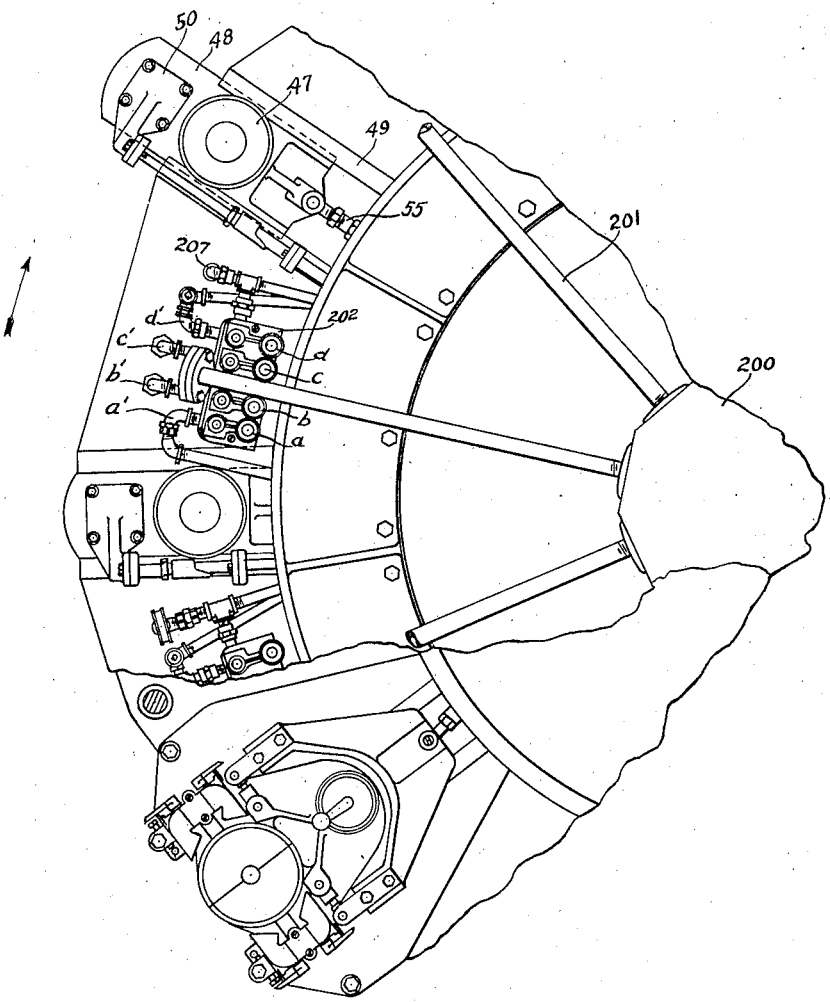

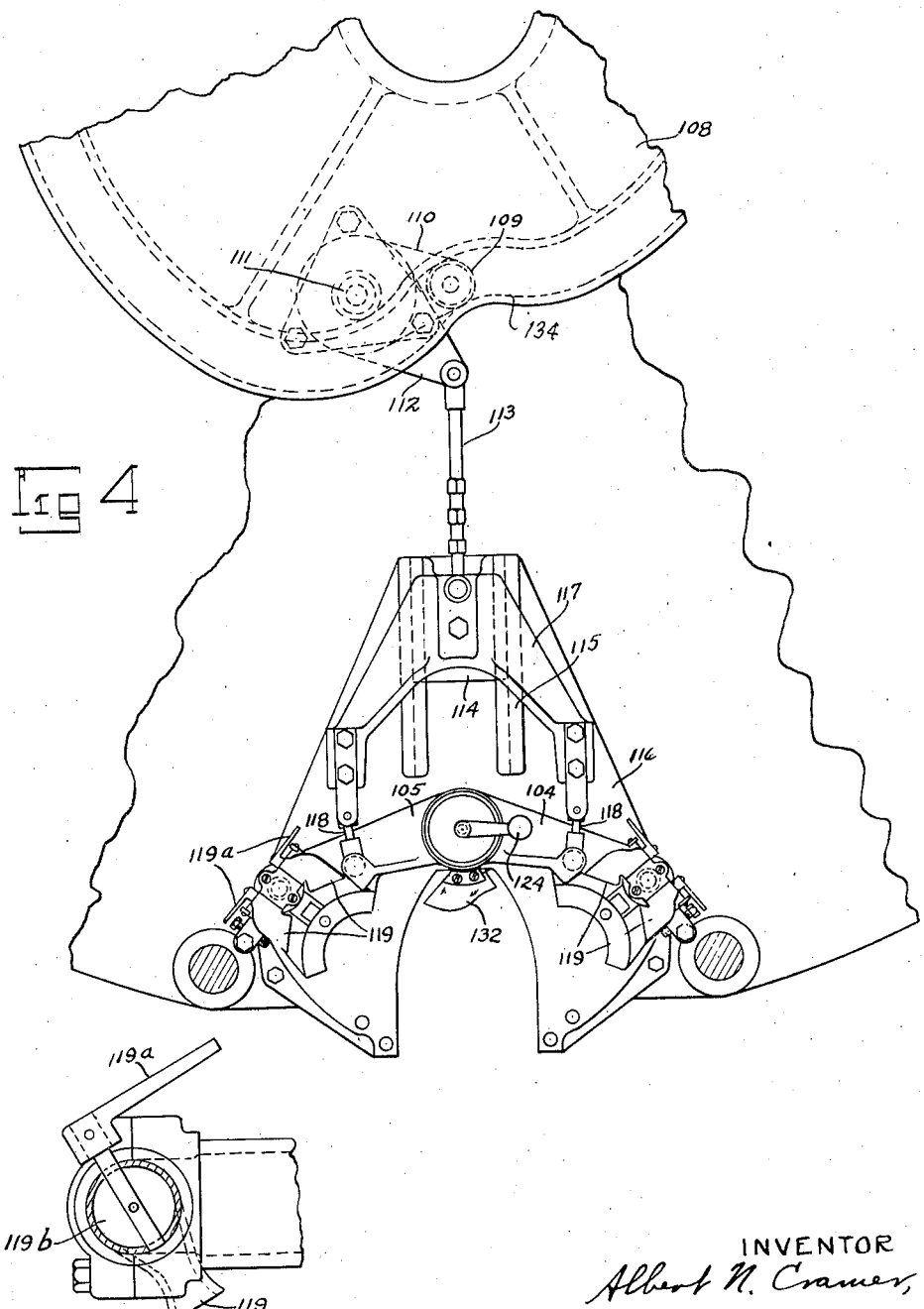

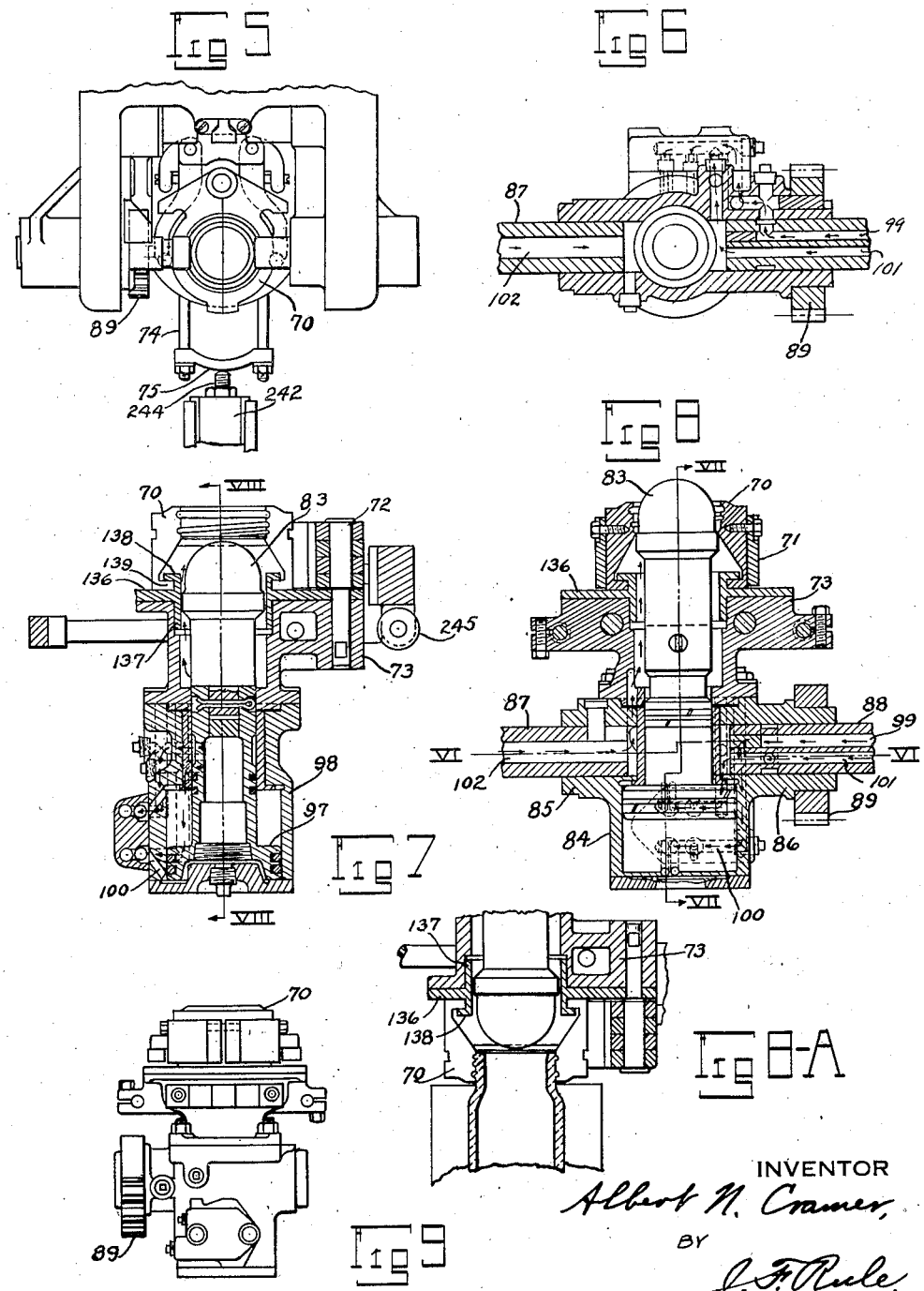

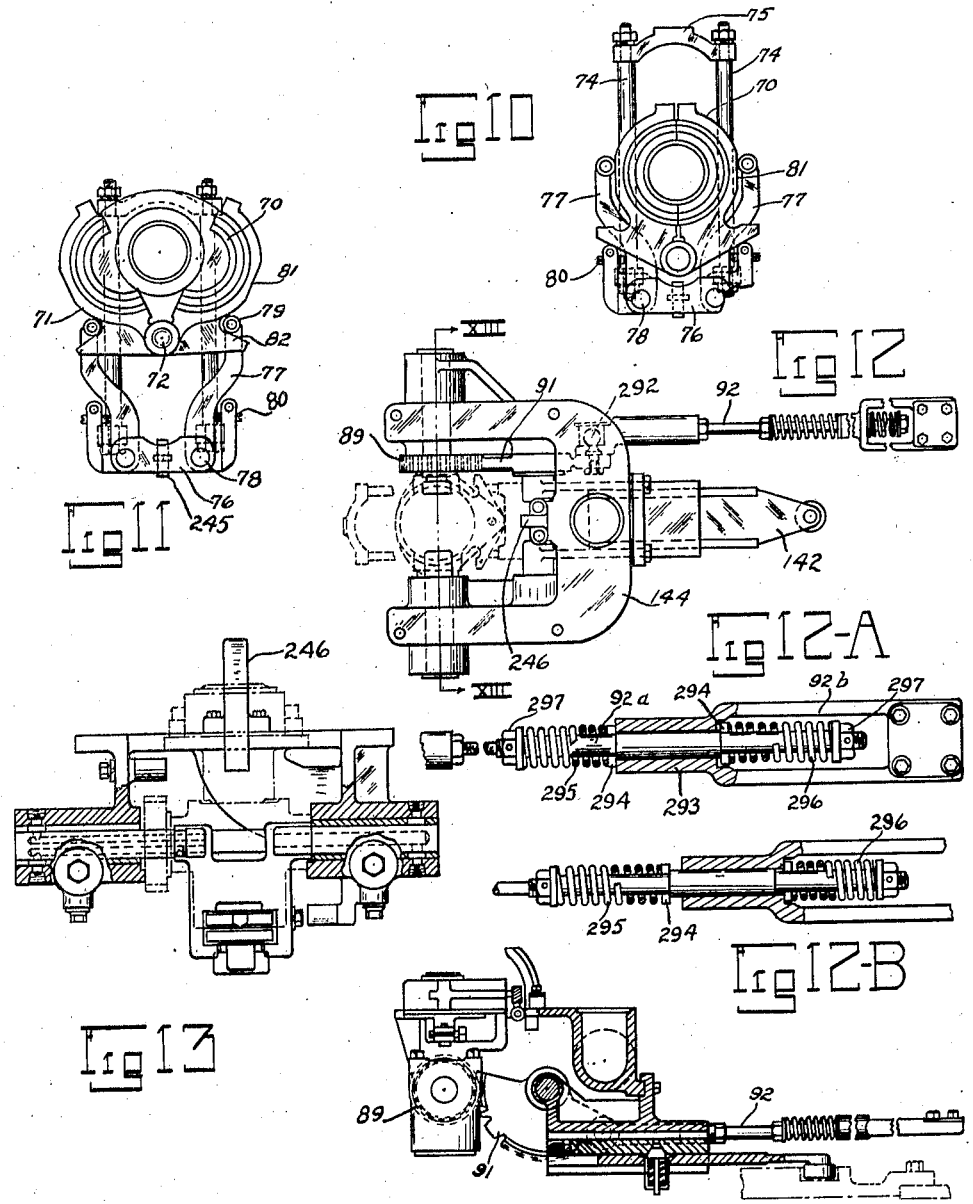

Nov. 27, 1928.
A. N. CRAMER
1,693,069

GLASS FORMING MACHINE

Filed Dec. 31, 1925
10 Sheets-Sheet 7

INVENTOR
Albert N. Cramer
BY
J. F. Rule,
HIS ATTORNEY.

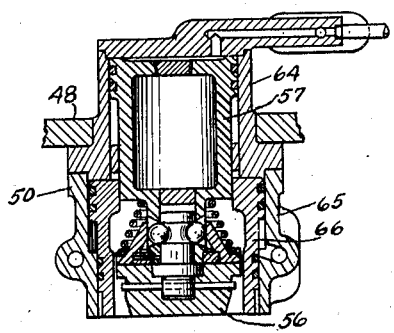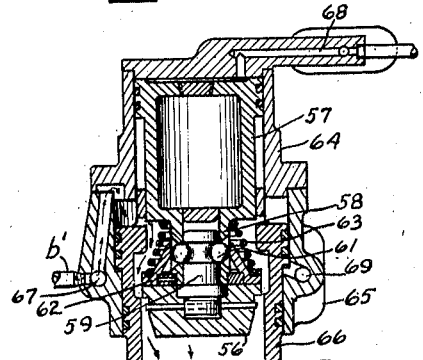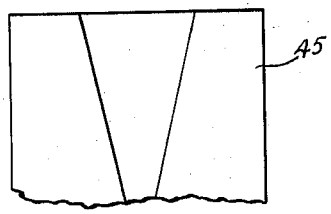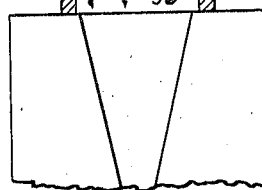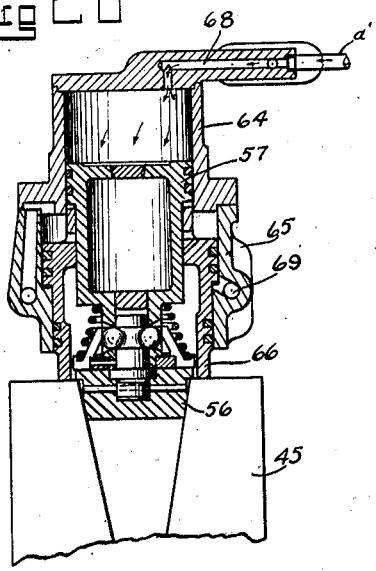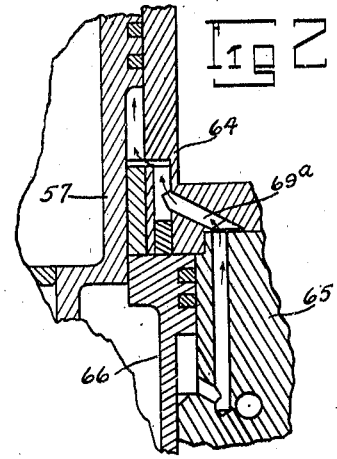

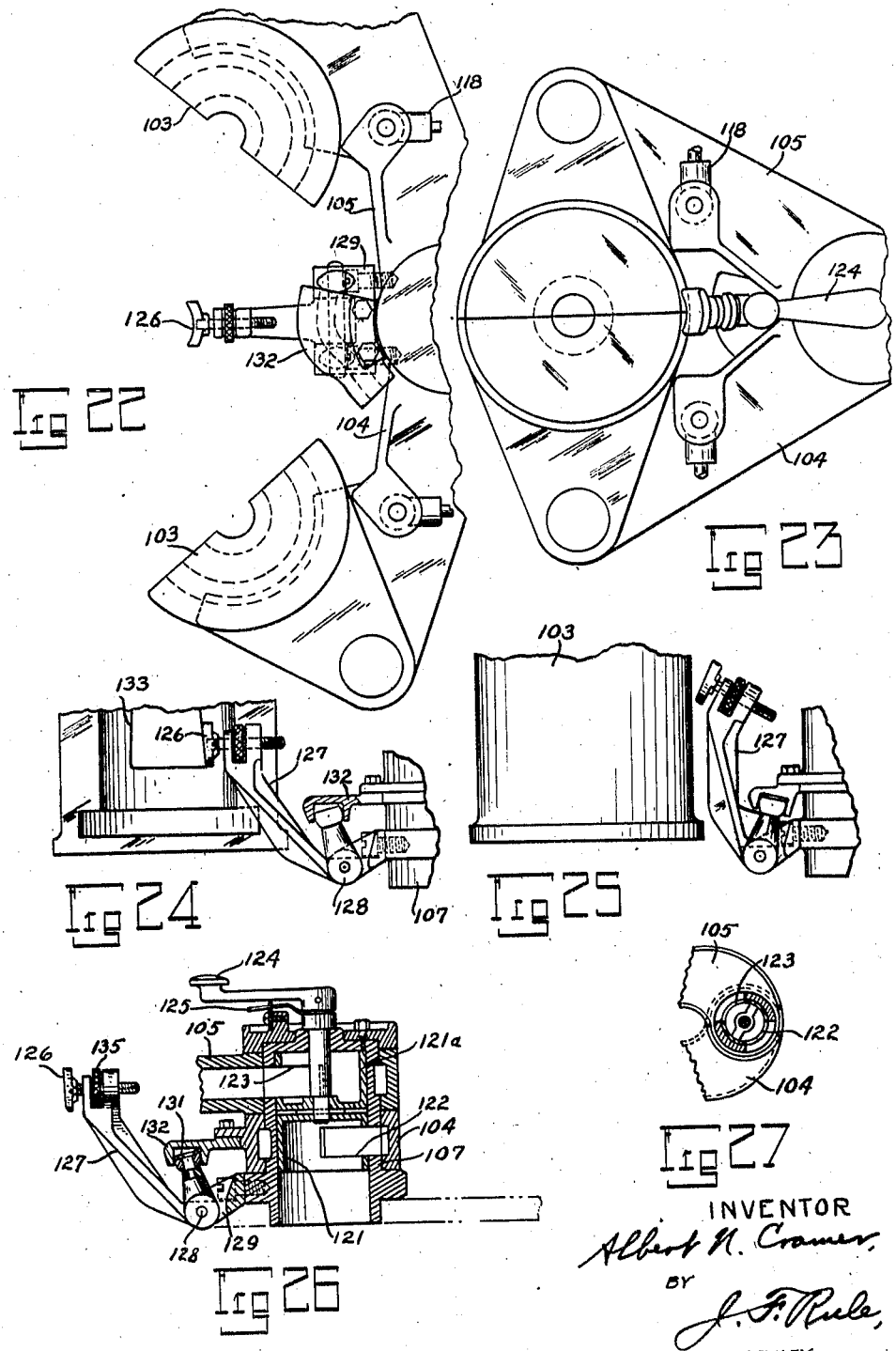

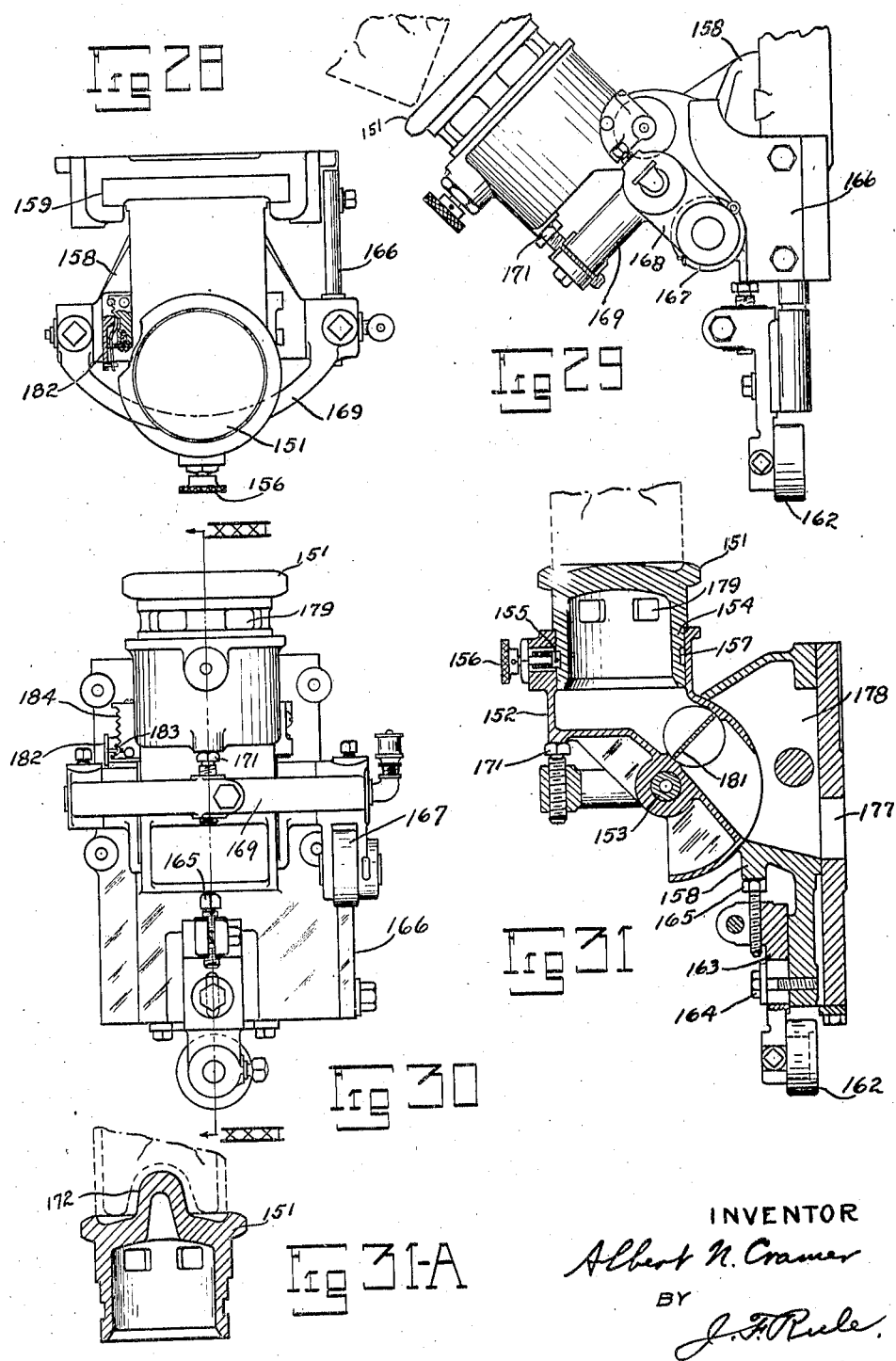

Patented Nov. 27, 1928.

1,693,069

UNITED STATES PATENT OFFICE.

ALBERT N. CRAMER, OF TOLEDO, OHIO, ASSIGNOR TO THE OWENS BOTTLE COMPANY, OF TOLEDO, OHIO, A CORPORATION OF OHIO.

GLASS-FORMING MACHINE.

Application filed December 31, 1925. Serial No. 78,581.

My invention relates to automatic machines for making bottles and other glass articles which are blown in molds. In its preferred form, it comprises a machine having a carriage rotating continuously about a vertical axis and comprising a plurality of mold groups or units each including a blank mold in which a charge of glass is received and partially formed, a neck mold, and a finishing mold in which the parison is blown to its final shape. As the mold carriage rotates, the blank molds are brought in succession to a charge receiving position, each with its upper end open to receive a charge of glass which is dropped therein from an automatic feeder.

When a blank mold has received its charge, a blow head is brought into position to close the charge receiving end of the mold and air pressure is supplied through said head to compact the glass in the mold and at the same time form the neck of the bottle or other article in the neck mold which is beneath and in register with the blank mold. Air under pressure is supplied through the neck of the blank to blow the parison in the blank mold, thus partially forming the bottle or other article. The blank mold now opens, leaving the parison supported in and projecting upward from the neck mold. The neck mold turn-over group including the neck mold and associated parts is next rotated about a horizontal axis to invert the neck mold, thereby swinging the parison downward to a depending position. The bottom plate is now moved vertically into position and the finishing mold then closes around the bottom plate and the parison and the latter is blown to its finished form, the neck mold is opened, and the turn-over group reinverted. After the blown article has cooled sufficiently to retain its shape, the mold opens, leaving the blown article supported on the mold bottom, and the latter is lowered and tilted to discharge the article from the machine.

An object of my invention is to provide improved means for mounting the neck mold turn-over group, permitting the latter to be quickly removed as a unit from the machine for adjustment, repairs or substitution of another unit.

A further feature of the invention relates to the mold bottoms and individual controlling devices to control the tilting of the mold bottoms for discharging the finished ware.

A further object of the invention is to provide improved means for holding the mold sections in closed position during the blowing of the parison therein.

A further object of the invention is to provide an improved air system for cooling the molds.

Other objects of the invention will appear hereinafter.

In the accompanying drawings:

Figure 1 is a sectional elevation showing a portion of a machine constructed in accordance with my invention, and also showing in broken lines a feeder for delivering charges of glass to the molds.

Figure 2 is a fragmentary elevation showing one of the mold groups or units.

Figure 2$^A$ is a sectional detail view of a blank mold and associated parts.

Figure 2$^B$ is a sectional detail view of a finishing mold and associated parts.

Figure 3 is a fragmentary top plan view of the machine.

Figure 4 is a fragmentary plan view on a larger scale showing a pair of mold carrying arms and their operating mechanism.

Figure 4$^A$ is a detail view showing a valve for a cooling nozzle.

Figures 5 to 9, inclusive, illustrate the neck mold turn-over group.

Figure 5 is a plan view of the neck mold and associated parts.

Figure 6 is a sectional view at the line VI—VI on Figure 8.

Figure 7 is a vertical section at the line VII—VII on Figure 8 and shows the neck mold plunger and the air motor for operating the plunger.

Figure 8 is a sectional elevation at the line VIII—VIII on Figure 7.

Figure 8$^A$ is a fragmentary view showing the neck mold in its cooperative relation to the finishing mold during the final blowing operation.

Figure 9 is an elevation of mechanism shown in Figure 5.

Figure 10 is a plan view of the neck mold and its opening and closing mechanism.

Figure 11 is a similar view but with the neck mold open.

Figure 12 is a plan view of the neck mold carrying frame and associated parts.

Figures 12^A and 12^B are detail views of a compressible and extensible link through which movement is transmitted to the turn-over group.

Figure 13 is a sectional elevation at the line XIII—XIII on Figure 12.

Figure 14 is a part sectional elevation of the mechanism shown in Figure 12.

Figure 15:
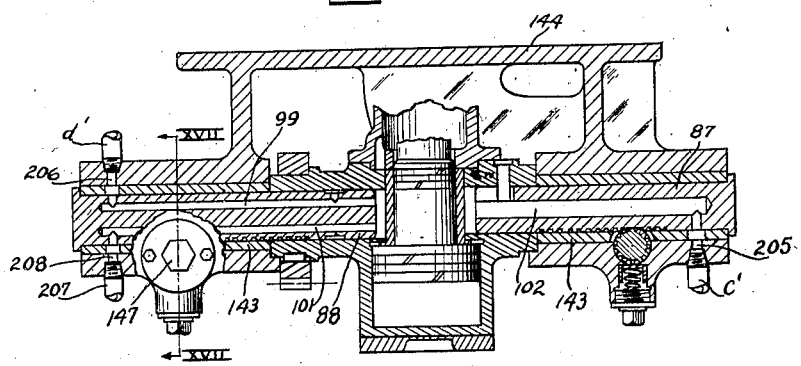

Figure 15 is a sectional elevation showing the removable turn-over unit and its supporting frame.

Figure 16:
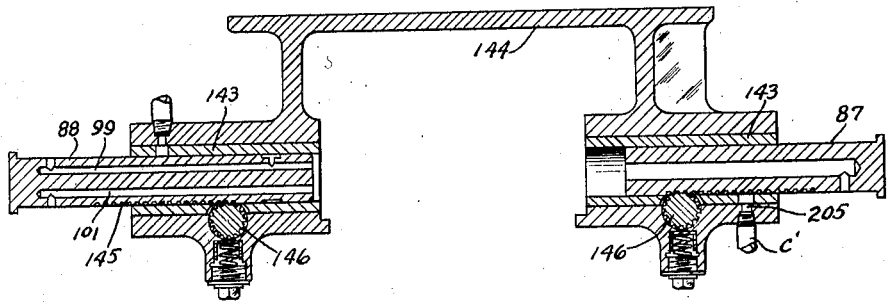

Figure 16 is a similar view of said frame and shows the bearing shafts for the turn-over unit withdrawn, permitting the removal of said unit.

Figure 17:
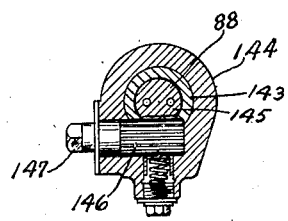

Figure 17 is a section at the line XVII—XVII on Figure 15.

Figures 18 to 21, inclusive, illustrate the blowing head and associated parts.

Figure 18 show the blowing head over a mold, but out of engagement therewith.

Figure 19 is a similar view, but with the annular piston lowered into contact with the mold, permitting air pressure to be supplied to the mold.

Figure 20 is a similar view but with the mold closing head lowered into the mold.

Figure 21 is a fragmentary view showing air ports for one of the motors shown in Figures 18 to 20.

Figures 22 to 26, inclusive, illustrate particularly the blank centering mechanism.

Figure 22 is a plan view of an open blow mold and a blank centering arm.

Figure 23 is a similar view showing the centering arm withdrawn and the mold closed.

Figure 24 is a part sectional elevation showing the centering arm in engagement with the depending parison.

Figure 25 is an elevation showing the centering arm withdrawn and the mold in closed position.

Figure 26 is a part sectional elevation of the centering arm and associated parts.

Figure 27 is a fragmentary view of the mold-carrying arms.

Figures 28 to 31, inclusive, illustrate the tiltable mold bottom.

Figure 28 is a plan view of the mold bottom and associated parts.

Figure 29 is a side elevation of the same, but with the mold bottom tilted.

Figure 30 is a front elevation of the parts shown in Figure 29, the mold bottom being in its upright position.

Figure 31 is a section at the line XXXI—XXXI on Figure 30.

Figure 31^A shows a modified form of mold bottom, adapted for use in making bottles with reentrant bottoms.

Referring to Figures 1, 2 and 3, the machine comprises a continuously rotating carriage including a lower section 35 carrying the finishing molds and bottom plates, an intermediate section 36 on which the blank molds and neck mold turnovers are supported, and an upper section 37 which supports the blow heads and funnel guides. Standards 38 extend from the section 35 to the section 36. Said standards are screw threaded to receive adjusting nuts 39 and 40, permitting vertical adjustment of the section 36. Similar standards may be provided between the sections 36 and 37. The carriage rotates continuously about a stationary central column 41, and is driven from any suitable source of power transmitted through a pinion 42 and ring gear 43.

As the mold carriage rotates, the blank molds 45 are brought in succession to a charge receiving position beneath a feeder 46 which may be of any approved construction and which is operated in synchronism with the movement of the mold carriage, to drop a charge of molten glass into each blank mold as the latter reaches its charge receiving position. Associated with each blank mold is a funnel guide 47 through which the charge is dropped and by which it is guided into the mold. Each funnel guide is mounted in a supporting plate 48 slidable radially of the mold carriage in guides 49 on the section 37. Each plate 48 also carries a blow head mechanism 50. The blow head and funnel are brought alternately into position over the blank mold by the radial movement of the carrying plate 48. A stationary cam plate 51 is formed with a cam 52 in which runs a cam roll 53 having lever and link connections 54, 55, with the plate 48 for operating the latter.

While the blank mold is passing beneath the feeder, the corresponding carrier plate 48 is in its projected position shown at the upper part of Figure 3, with the funnel directly over the mold. As the mold passes beyond the charge receiving position, the carrier plate 48 is drawn inward to bring the blow head over the mold.

The blow head and its actuating mechanism will now be described. Referring particularly to Figures 18 to 21, a head or plug 56 is shaped to enter and close the upper end of the blank mold 45. Said head is actuated by an air motor comprising a piston 57, the lower end of which is formed with a sleeve extension 58 into which projects a stem 59 attached to and extending upward from the head 56. The stem 59 is locked in the sleeve 58 by means of balls 61 introduced through lateral openings in the sleeve 58 and seated in an annular groove formed in the stem 59. A tapered locking sleeve 62 holds the balls 61 in position. The sleeve 62 is seated on the head 56 and held in position by a coil spring 63. The piston 57 works in a casing 64 carried in the plate 48. Attached to the casing 64 and extending downward therefrom is an outer shell 65 within which is an annular piston or sleeve 66 movable up and down in said shell.

When the blow head is brought to the Figure 18 position over the mold, air under pressure is admitted through a port 67, thereby supplying air pressure above the piston 66 and causing the latter to move downward to the Figure 19 position into engagement with the mold. This movement carries the upper end of the piston 66 below the piston 57 and admits the air under pressure to flow downward past the head 56 into the mold, thereby applying pressure to the charge of glass in the blank mold and serving to compact the glass in the blank mold and the neck mold which at this time is directly beneath and in register with the blank mold. This pressure serves to form the neck of the bottle or other article.

Air is now admitted through a port 68 above the piston 57 so that the latter moves downward and causes the head 56 to enter and close the upper end of the mold (Fig. 20). The parison is now blown to hollow form in the mold, as hereinafter set forth. Air pressure supplied through a port 69 then forces the piston sleeve 66 upward away from the mold. During the initial upward movement of the sleeve 66, the piston 57 is carried upward therewith. The piston 57 is then moved upward independently of said sleeve to the Figure 18 position by means of constant air pressure through a port 69$^a$.

The neck mold 70 (see Figs. 5 to 11) comprises two sections carried on neck mold arms 71 which swing on a pivot pin 72 extending upward from a casting 73 which forms part of the neck mold turn-over unit. The neck mold sections are opened and closed by means of a frame comprising parallel rods 74, a yoke 75 at one end of the rods and a frame member 76 at their opposite end. Arms 77 connected by pivots 78 to the frame member 76, carry rolls 79 which engage faces 81 on the arms 71 when the parts are in the Figure 10 position, thereby holding the neck mold closed. Adjusting screws 80 in the frame member 76, serve as stops to limit the outward swinging movement of the arms 77, and permit said arms to be accurately adjusted for holding the neck mold closed. When the frame is moved lengthwise (by means hereinafter described) to the Figure 11 position, the rolls 79 engage lugs 82 on the arms 71 and separate the mold sections.

The turn-over unit includes the neck mold and its operating parts (Figs. 10 and 11), the casting 73 (Figs. 7 and 8) on which said parts are mounted, a plunger 83 which forms the initial blow opening in the neck of the bottle, 70 and an air motor 84 for actuating the plunger. The casing of the motor is provided with trunnions 85 and 86 journalled on shafts 87 and 88 respectively, permitting the turn-over unit to oscillate about the shafts 75 87 and 88 for inverting and reinverting the neck mold. This movement of the turn-over unit is controlled by a stationary cam track 93 (Fig. 1) on which runs a cam roll 94 having operating connections through lever arms 80 95 and 96 to a rod 92. This rod has a ball and socket connection 292 (Fig. 12) with a gear segment 91 in mesh with a pinion 89 fixed to the trunnion 86.

The rod 92 is so constructed that it is extensible and compressible in the direction of its length. Referring to Figures 12$^A$ and 12$^B$, said rod comprises telescoping sections 92$^a$ and 92$^b$. The part 92$^b$ comprises a sleeve portion 293 slidable on the part 92$^a$. That portion of the rod within the sleeve 293 is of larger diameter than the adjoining portions of the rod, thereby providing shoulders against which bear washers 294 slidable on the rod. Compression springs 295 and 296 are interposed between said washers and the ends of the rod 92$^a$.

A purpose of this construction is to permit the turn-over unit to be held firmly against its limiting stops when rotated in either direction, regardless of any irregularities or inaccuracies in its operating cam 93. The parts 92$^a$ and 92$^b$ are normally held in the relative position shown in Figure 12$^A$ during the inverting movements of the turn-over unit. During the upward swinging movement of the neck mold, the rod 92 is moving inward toward the center of the mold carriage. This movement continues until said unit is arrested by engaging a stop. The cam 93 is so formed that the section 92$^b$ is given a slight additional movement after the turn-over group is arrested, thereby moving the part 92$^b$ lengthwise on the rod 92$^a$ and compressing the spring 296, the parts now being in the Figure 12$^B$ position. The turn-over unit is therefore held against its stop under the tension of the compressed spring 296. When the turn-over unit is inverted to swing the neck mold downward and is arrested by its stop in the downward position, the spring 295 is compressed by an outward movement of the section 92$^b$ on the rod 92$^a$, the operation being the same in principle as that just described in connection with the arrest of the neck mold in its up position. It will be observed that the springs 295 and 296 act entirely independent of each other. When one is operative the other is idle. Each spring is at all times held under compression determined by the positions of adjusting nuts 297. The rod 92 is only extensible or compressible when the force transmitted therethrough is sufficient to overcome the spring pressure.

Referring to Figures 7 and 8, the plunger 83 is actuated by an air motor comprising a piston 97 working in an air cylinder 98. At the time the charge of glass is received in the mold, the plunger tip 83 is in the Figure 8 position. Air under pressure for lifting the plunger to this position is supplied through a channel 99 in the shaft 80 and thence through passageway 100 leading to the lower end of the motor 84. The plunger 83 is retracted by means of air pressure admitted through a channel 101 extending through the shaft 88 and communicating through a passageway, as indicated by the arrows, (Fig. 8), to the motor cylinder above the piston 97.

At the time a charge of glass is dropped into the blank mold, the plunger tip 83 is in its projected position (Fig. 8). Air under pressure is then supplied through the blow head 50, as above described, to compact the glass in the mold and form the neck of the bottle in the annular space between the plunger tip 83 and the neck mold 70. The plunger tip 83 is then withdrawn and air under pressure is blown upward through the neck mold to blow the parison in the blank mold, the mold closing plug 56 (Fig. 20) at this time being in its lowered position. This blowing air is supplied through a channel 102 in the shaft 87 and thence upward, as indicated by the arrows (Fig. 8), into and through the neck mold. Before this air pressure is supplied for blowing the parison, the plunger is withdrawn to the Figure 7 position.

After the parison has thus been blown in the blank mold, the blow head 56 is withdrawn and the blank mold opened, leaving the bare parison held in the neck mold and projecting upward therefrom. The turn-over unit now operates to invert the neck mold, swinging the bare parison outward and downward to a vertically depending position. The bottom plate is now raised to contact with the lower end of the parison while it is held in position by the centering device. The finishing mold 103 then closes around the parison. The finishing mold sections are carried on arms 104 and 105 (see Figs. 4 and 22 to 27) having bearings on a hollow shaft or drum 107. The opening and closing movements of the finishing mold are controlled by a stationary cam 108 (Figs. 1 and 4) comprising a cam groove in which runs a roll 109 on a rock arm 110 connected to a rock shaft 111 to which is also connected a rock arm 112, the latter connected through a rod 113 to a slide block 114 movable radially of the mold carriage in guides 115 on a supporting plate 116. The rock arms 110 and 112 may be connected by any suitable means so that they will act in unison. Attached to the slide block 114 is a yoke 117 connected through links 118 to the mold carrying arms 104 and 105.

The mechanism for opening and closing the parison molds 45 is substantially the same as that just described for operating the finishing molds, and comprises a cam track 93¹ (Fig. 1) on which runs a cam roll 94¹ having operating connections through lever arms 95¹ and 96¹ to a rod 92¹ connected to a yoke 117ª corresponding to the yoke 117 (Fig. 4).

Air under pressure for cooling the finishing molds is supplied through the drum 107 (Fig. 26) and thence through the hollow arms 104, 105, to blowing nozzles 119 (see Figs. 2 and 4) which direct the air against the exterior surfaces of the molds. Mounted within the hollow shaft 107 are valves 121 and 121ª for controlling the supply of air to the nozzles. These valves are formed with ports 122 and 123 adapted to register with corresponding ports in the drum 107, the ports in the drum 107 opening, respectively, in the hollow arms 104, 105. The valves are rotatable by means of a hand crank 124 for opening the ports to any desired extent and thereby regulating the amount of cooling air supplied to the mold, and are held in adjusted position by a spring detent 125. In addition to the means just described for controlling the supply of cooling air, there are also provided valves 119ᵇ (Fig. 4ᴬ) individual to the nozzles 119 (Fig. 4), operated by hand levers 119ª, for regulating the supply of air through each nozzle to control the degree of cooling on each side of mold.

When the bare parison is swung downward by the inversion of the neck mold, the parison is centered with respect to the finishing mold before the latter closes, by means of a centering device (Figs. 22 to 26) which will now be described. This device comprises a centering finger or plate 126 carried by an arm 127 pivoted at 128 to a yoke 129 attached to the shaft 107. The arm 127 carries a cam roll 131 which runs in a cam groove formed in a cam plate 132. The cam plate is attached to the hub of the arm 104 so that the cam swings about the axis of the shaft 107 during the opening and closing movements of the finishing mold.

During the formation of a parison, the corresponding finishing mold is held open by the cam 108 (Fig. 4) but not to its widest extent. As the parison swings downward, the centering finger 126 is held in such position that the parison 133 can swing a short distance beyond its depending vertical position before engaging said finger. This prevents the parison from being arrested too suddenly and thereby prevents distortion and also prevents cracking or checking of the glass adjacent the neck mold, which might otherwise occur. When the parison is thus arrested, the finishing mold sections are further separated by means of the cam 108 which comprises a section 134 shaped to effect such opening movement. This moves the cam 132 to a position to swing the centering finger 126 forward sufficiently to return the blank to its vertical position, in which it is accurately centered with respect to the finishing mold. When the parison is definitely centered, the bottom plate 151 (Fig. 29) is raised by its cam, as hereinafter set forth, to contact with the parison and retain it in its centered position. The finishing mold sections are now swung to their closed position, such movement serving to withdraw the centering arm 127 backward to the Figure 25 position to clear the finishing mold before the latter closes around the parison. The centering finger 126 is adjustable by means of a thumb piece 135 threaded on the stem of the centering finger.

After the finishing mold closes around the parison, the latter is blown therein to its finished form by means of air supplied through the neck mold. A neck mold adapter including a plate 136 (Figs. 7, 8 and 8ᴬ) is provided to form a substantially air tight connection between the neck mold and the head 73. This adapter is formed with a cylindrical extension or sleeve 137 projecting from one side of the plate 136 and surrounding the plunger. Said sleeve is also extended from the opposite side of the plate 136 and formed with an annular flange 138. The neck mold sections are provided with inwardly extending flanges or tongues 139 to enter the annular groove between the plate and the flange 138. The upper and lower faces of the tongues 139 and the surfaces of the adapter with which they engage, are machined to make a close fit, thereby forming a substantially air tight connection between the neck mold and the adapter, the latter also having a substantially air tight joint with the cylindrical bore of the part 73 through which the plunger extends. The adapter also holds the neck mold sections at the same level, preventing one section from sagging below the other, and thus avoiding any offset or irregularity in the end surface of the finished article, at the plane where the neck mold sections meet. The tongue and groove connection between the adapter and the neck mold sections also serves to prevent said sections from sagging and rubbing on the upper surface of the bottle as the neck mold opens, because said tongue and groove connection is maintained until the mold sections are separated sufficiently to clear the bottle. This prevents the rapid wear of the mold sections, due to the abrasive action of the glass, which occurs when the mold sections are permitted to bear against the edge of the bottle during their opening movement. The result of such wear appears as a defect in the finished bottle.

After the parison has been blown in the finishing mold, the frame comprising part 74, 75, 76, is moved lengthwise from the Figure 5 position to the Figure 11 position to open the neck mold. This opening of the neck mold is effected by a cam 141 (Fig. 1) which operates an arm 142 and a slide block 242 connected thereto through a spring held detent 243. Said detent acts as a safety device to permit the arm 142 to move independently of said block in the event of any obstruction interfering with the movement of said block or parts actuated thereby. The slide block 242 carries an adjustable screw 244 (Fig. 5) for engaging the yoke 75 and operating the neck mold opening frame. The opening of the neck mold takes place a short time before it is brought beneath the feeder. After the neck mold is opened, the turn-over unit is reinverted to bring the neck mold into register with the corresponding parison mold 45 preparatory to receiving the next charge of glass. As the turn-over unit is completing this swinging movement, a roll 245 on the frame member 76 engages a cam 246 on the frame 144 and operates the neck mold closing frame to close the mold.

For the purpose of permitting the turn-over unit to be quickly removed from the machine for repairs or to permit the substitution of a different unit, the following construction is provided: Referring to Figures 15 to 17, the bearing shafts 87 and 88 on which said unit is oscillated, are movable lengthwise in bearing sleeves 143 in the frame 144. The shafts 87 and 88 are flattened on their lower faces and provided with rack teeth 145 which are engaged by pinions 146 mounted in the frame 144. The pinion shafts are formed with squared or non-circular heads 147 to which a wrench or tool may be applied for rotating said pinions and thereby moving the shafts lengthwise to withdraw them from the turn-over head. This permits the turn-over unit to be lifted bodily from the machine.

The finishing mold bottom and its operating mechanism as shown in detail in Figures 28 to 31 will now be described. The mold bottom 151 is removably supported in a carrier 152 mounted on a horizontal rock shaft 153 for tilting movement. The mold bottom comprises a cylindrical extension 154 which fits in the carrier 152. A spring actuated detent 155 which can be withdrawn by a handle 156, fits in an annular groove 157 in the extension 154, thereby permitting the mold bottom to be quickly removed or placed in the carrier. The carrier 152 is supported on a frame 158 mounted for vertical movement in guideways 159 on the lower section 35 (Fig. 1) of the mold carriage. The frame 158 is periodically moved up and down by means of a stationary cam 161 on which runs a roll 162 carried on an upright arm 163 clamped to the frame 158 by a screw bolt 164. By loosening the bolt 164, a relative vertical adjustment of said arm and the frame 158 can be effected. An adjusting screw 165 which abuts against the frame 158 permits a nice adjustment. The cam 161 lifts the mold bottom into engagement with the centered parison (as heretofore noted) just before the finishing mold closes around the parison. A cam 166 secured to the frame of the mold carriage, controls the tilting movements of the mold bottom. A roll 167 which runs on said cam is carried on an arm 168 fixed to the shaft 153. A yoke 169 also fixed to said shaft provides a support for the carrier 152. The yoke carries an adjusting screw 171 on which the carrier 152 is seated. The adjusting screw 171 provides for adjustment of the mold bottom about the axis of the shaft 153. This in combination with the vertical adjustment by means of the screw 165, permits the mold bottom to be accurately adjusted to fit the finishing mold sections.

After an article has been blown in the finishing mold and the mold sections separated, leaving the article supported on the mold bottom 151, the frame 158 which carries the mold bottom moves vertically downward in the guides 159. During this downward movement, the roll 167 runs down the inclined cam, permitting the mold bottom to tilt to the Figure 29 position and thereby causes the finished article to drop by gravity from the machine.

Figure 31$^A$ shows a mold bottom having a central projection 172. This bottom is designed for making bottles or other ware with reentrant bottoms, that is, bottoms which project upward within the body of the bottle. When this form of bottom is employed, the parison as formed in the blank mold is preferably provided with a recess for receiving the projection 172. This projection is of such shape that the finished bottle can be discharged by the tilting movement of the mold bottom.

Air under pressure for cooling the molds is supplied from an air drum 175 (Fig. 1) beneath the mold carriage, to an air chamber 176 formed in the lower section of the mold carriage and from this chamber is distributed to air passages leading to the cooling nozzles. Air from the chamber 176 passes through a port 177 (Figs. 1 and 31) to an air chamber 178 formed in the frame 158. From thence the air passes upward through the hollow carrier 152 and is discharged through outlets 179. Cooling air is thus caused to circulate through the hollow mold bottom and in direct contact with the under surface of the mold bottom floor, whereby overheating is prevented and the lower end of the glass article cooled at substantially the same rate as the side walls thereof.

Individual dampers 181 control the supply of cooling air to the mold bottoms, each damper being adjustable to regulate the amount of air supplied. Each damper is operated by a hand lever 182 which is secured to the damper shaft and carries a spring actuated detent 183 to engage a notched holding plate 184 and thereby hold the damper in its adjusted position.

Air for cooling the finishing molds is supplied from the chamber 176 through a port 185 (Fig. 1) to the drum 107 and thence to the blowing nozzles, as heretofore described. Air for cooling the blank molds passes from the chamber 176 upward through telescoping pipe sections 186 and 187 (Figs. 1 and 2) to an air chamber 188 of the blank mold unit frame. From the chamber 188 the air is supplied to the blank mold cooling nozzles through a hollow drum 107$^a$ forming the axis of the mold carrying arms, and through said arms to the blowing nozzles 119$^a$, the construction and arrangement of these parts being substantially the same as heretofore described in connection with the means for cooling the finishing molds.

Referring particularly to Figures 2, 2$^A$ and 2$^B$, the finishing mold sections 103 are held in position on the arms 104, 105, by means of pins 190 on said arms, the mold sections being provided with openings to fit over said pins. The supporting arms 104, 105 are formed with vertical faces 191 which, when the mold sections are closed, bear against lateral lugs 192 formed on the mold sections. These lugs are located at substantially the same height as the center of the area of outward pressure within the mold when the bottle is being blown. In other words, the bearing lugs 192 are so located that the internal pressure above the lugs is balanced by the internal pressure below the lugs. The construction here shown permits this balanced pressure to be obtained with molds of different heights. As the bearing faces 191 are vertical, the lugs on the molds may be located at any required height on the mold, depending on the length of the blown article or, more specifically, on the height at which the center of the internal pressure is located. The blank mold sections 45 (Fig. 2$^A$) are also provided with lugs 192 which bear against the vertical faces 191 of the mold carrying arms, said lugs being located opposite the center of the blowing pressure within the blank mold.

The means for controlling the supply of air under pressure to the blowing head and the neck mold turn-over group will be understood by reference to Figures 1 and 3. Air under pressure is supplied from any suitable source to a distributing head 200 at the top of the machine and is distributed from said head through radial pipes 201 leading to valve boxes 202 on the mold carriage, there being one such valve box for each mold group. Mounted on each valve box is a series of valve levers a, b, c and d actuated by a series of cams 203 on a stationary cam plate 204. The valve levers a, b, c and d actuate corresponding valves in the valve box 202 for admitting air under pressure to pipes $a'$, $b'$, $c'$ and $d'$, respectively. The pipe $a'$ leads to the blow head (Fig. 20) and communicates with port 68 for supplying air to lower the blow head, as heretofore described. Pipe $b'$ extends to the port 67 (Fig. 19) for supplying air therethrough for the purpose heretofore stated. The pipe $c'$ leads to a port 205 (Fig. 15) opening into the channel 102 for supplying air through the neck mold for blowing the parison, as heretofore described. The pipe $d'$ extends to a port 206 (Fig. 15) communicating with the channel 99 which supplies air to the lower end of the piston cylinder 84 (Fig. 8) for projecting the plunger 83. Continuous air pressure is maintained in a pipe 207 (Figs. 3 and 15) extending from the valve box 202 to a port 208 opening into the channel 101 communicating with the motor cylinder 84 above the piston 97 for lowering the latter and withdrawing the plunger 83 when the air pressure beneath the piston 97 is relieved. The pipe 207 is also connected by means of a telescoping line to the port 69 of the blow head unit which supplies constant air pressure to a limited area beneath the pistons 57 and 66. Thus, when pressure is relieved from the top of these pistons this constant air pressure causes them to move upward.

Modifications may be resorted to within the spirit and scope of my invention.

What I claim is:

1. In a glass forming machine, the combination of a rotary mold carriage, molds thereon, each comprising separable sections, hollow arms carrying said sections, hollow shafts on which said arms swing for opening and closing the molds, said hollow shafts and arms providing communicating air passages through which cooling air is supplied, means for distributing cooling air to said hollow shafts, means for directing the cooling air from said arms against the mold sections, and manually adjustable valves individual to said hollow shafts for controlling the air supply therethrough.

2. In a glass forming machine, the combination of a rotary mold carriage, molds thereon, each comprising separable sections, hollow arms carrying said sections, hollow shafts on which said arms swing for opening and closing the molds, said hollow shafts and arms providing communicating air passages through which cooling air is supplied, means for distributing cooling air to said hollow shafts, manually adjustable valves individual to said hollow shafts for controlling the air supply therethrough, nozzles connected to said hollow arms for directing the cooling air against the mold sections, and valves in said arms adjustable to regulate the supply of cooling air to each mold section independently of the others.

3. In a glass forming machine, the combination of a mold comprising separable sections, hollow arms carrying said sections, a hollow shaft on which said arms are mounted, said shaft and arms providing communicating passageways through which cooling air is conveyed, and a damper located within said hollow shaft and adjustable to regulate the supply of cooling air therethrough.

4. In a glass forming machine, the combination of a mold comprising separable sections, hollow arms carrying said sections, a hollow shaft on which said arms are mounted, said shaft and arms providing communicating passageways through which cooling air is conveyed, a damper located within said hollow shaft and adjustable to regulate the supply of cooling air therethrough, nozzles connected to said hollow arms and arranged to direct the cooling air against the mold sections, and dampers individual to said arms for controlling the passage of air to the nozzles.

5. In a glass forming machine, the combination of a mold comprising separable sections, a plurality of air nozzles associated with each mold section and arranged to direct cooling air against the mold section, and valves individual to said nozzles for controlling the air supply to each nozzle independently of the others.

6. In a glass forming machine, the combination of a mold comprising a body portion and a separate mold bottom, said bottom being hollow, and means for circulating cooling air therethrough.

7. In a glass forming machine, the combination of a mold comprising a body portion and a separate mold bottom, said bottom being formed with a hollow cylindrical extension, and means for supplying cooling air under pressure thereto, said extension having openings in its side walls for the escape of the air.

8. In a glass forming machine, the combination of a mold bottom, a hollow tiltable carrier on which said bottom is mounted, and means for directing cooling air through said carrier and causing it to circulate in contact with the mold bottom.

9. In a glass forming machine, the combination of a mold bottom, a hollow tiltable carrier on which said bottom is mounted, means for directing cooling air through said carrier and causing it to circulate in contact with the mold bottom, and a damper within said carrier adjustable to regulate the flow of cooling air.

10. The combination of a rotatable mold carriage, a hollow frame mounted for up and down movement on said carriage, a hollow carrier tiltably mounted in said frame, a mold bottom supported on said carrier, and means for supplying air under pressure to the air chamber formed by said hollow frame, said air chamber being in constant communication with the interior of said hollow carrier for supplying cooling air to the mold bottom.

11. In a glass forming machine, the combination of a rotatable mold carriage, a frame slidably mounted thereon for up and down movement, a mold bottom tiltably mounted on said frame, and a cam on the mold carriage arranged to control the tilting movements of the mold bottom.

12. In a glass forming machine, the combination of a rotatable mold carriage, a frame slidably mounted thereon for up and down movement, a mold bottom tiltably mounted on said frame, a cam on the mold carriage, and connections between said cam and mold bottom for holding the latter in upright position when said frame is elevated and permitting the mold bottom to tilt when said frame is lowered.

13. In a glass forming machine, the combination of a rotatable mold carriage, a series of mold bottoms tiltably mounted thereon, cams individual to said mold bottoms for controlling the tilting of the mold bottoms, and means controlled by the rotation of the mold carriage for causing said tilting movements of the mold bottoms.

14. In a glass forming machine, the combination of a rotatable mold carriage, a series of mold bottoms tiltably mounted thereon, cams individual to said mold bottoms for controlling the tilting of the mold bottoms, a stationary cam, and means operated thereby to cause said individual cams to cooperate in succession with the mold bottoms to effect the tilting of the mold bottoms in succession.

15. In a glass forming machine, the combination of a mold carriage, a frame movable up and down on the mold carriage, a mold bottom, a carrier therefor pivotally mounted on said frame, a cam supported on the mold carriage, a support interposed between said cam and carrier for supporting the latter and controlling its tilting movement, adjusting means between said support and carrier, and means for moving said frame up and down and tilting the carrier and mold bottom.

16. In a glass forming machine, the combination of a mold carriage, a frame movable up and down on the mold carriage, a mold bottom, a carrier therefor pivotally mounted on said frame, a cam supported on the mold carriage, a support interposed between said cam and carrier for supporting the latter and controlling its tilting movement, adjusting means between said support and carrier, means for moving said frame up and down and tilting the carrier and mold bottom, said last mentioned means comprising a stationary cam, an arm attached to said frame and adjustable up and down relative thereto, and a cam roll on said arm running on said stationary cam.

17. The combination of a mold carriage, a body mold, a neck mold, a carrying frame on which said neck mold is mounted, a shaft supported on the mold carriage and forming a support for said frame, and automatic means for rotating said neck mold and its supporting frame about the axis of said shaft for inverting the neck mold independently of the body mold, said shaft being movable in the direction of its length into position to release said supporting frame and permit said frame and neck mold to be removed as a unit from the mold carriage.

18. A glass forming machine comprising, in combination, a mold carriage, body molds on said carriage, turn-over units individual to the body molds and each including a neck mold and a support therefor, and shafts supported on the mold carriage and supporting said units, said shafts being movable in the direction of their length to withdraw them from the turn-over units and permit the latter to be removed from the mold carriage independently of the body molds.

19. A glass forming machine comprising, in combination, a mold carriage, body molds, turn-over units each including a neck mold and a support therefor, shafts supported on the mold carriage and supporting said units, and manually operated means for withdrawing said shafts endwise from said units and permitting the latter to be removed bodily from the mold carriage independently of the body molds.

20. A glass forming machine comprising, in combination, a mold carriage, turn-over units each including a mold and a support therefor, shafts supported on the mold carriage and supporting said units, and manually operated means for withdrawing said shafts endwise from said units and permitting the latter to be removed bodily from the mold carriage, said means comprising racks on said shafts and pinions meshing with said racks.

21. In a glass forming machine, the combination of a mold, a support therefor, a mold carriage, a shaft supported on the mold carriage and on which said support is mounted, means for rotating said mold and its support about the axis of said shaft, and rack and pinion mechanism for withdrawing said shaft lengthwise from said support.

22. In a glass forming machine, the combination of a turn-over unit comprising a neck mold, a plunger, an air motor for moving the plunger into and out of the neck mold, automatic means for oscillating said turn-over unit about a horizontal axis for inverting and reinverting the neck mold, shafts on which said unit is mounted for said inverting movement, a supporting frame on which said shafts are carried, and means for moving said shafts lengthwise in the supporting frame for withdrawing the shafts from said unit and thereby disconnecting said unit from said supporting frame.

23. The combination of a sectional mold, pivoted arms carrying the mold sections, cams on said arms, a movable frame, members pivoted on said frame and arranged to engage the cams and close the mold, and adjusting screws by which said members are adjustably held in mold closing position.

24. The combination of a sectional neck mold, arms carrying the neck mold sections, means for actuating said arms for closing the mold, said means comprising a frame, means to move said frame, arms pivoted on said frame and arranged to engage the mold carrying arms and cam them to mold closing position when the frame is moved in one direction, and adjustable stops for limiting the swinging movement of said pivoted arms.

25. In a glass forming machine, the combination of a rotatable carriage, a part mounted thereon for a limited reciprocating movement radially thereof, a stationary cam, operating connections between said cam and said part for causing the rotation of the carriage to effect said reciprocating movement, said connections comprising a rod having sections relatively movable in a direction lengthwise of the rod, springs placed under compression respectively by the lengthening and shortening of said rod, and means to prevent either spring from expanding while the other is being compressed.

26. In a glass forming machine, the combination of a rotating mold carriage, a mold turn-over group thereon, a stationary cam, operating connections between the cam and turn-over group including a power transmitting rod comprising telescoping sections, a spring arranged to be placed under compression by a relative movement of said sections in one direction, a second spring arranged to be placed under compression by a relative movement of said sections in the opposite direction, and means to prevent either spring from opposing the action of the other.

27. The combination of a continuously rotating mold carriage, blank molds and finishing molds thereon, a turn-over unit comprising a neck mold, means for oscillating said unit to swing the neck mold between the blank mold and finishing mold, and means including rack and pinion mechanism permitting removal of said unit from the mold carriage independently of the blank molds and finishing molds and without interrupting the continuous rotation of the carriage.

28. In a glass forming machine, the combination of a mold bottom, a carrier on which the mold bottom is removably mounted, said carrier being tiltable to tilt the mold bottom, a support for said carrier tiltable about the axis of said carrier, adjusting means for changing the angular relation between said carrier and support, and a cam controlling the tilting movements of said support.

29. The combination of a horizontally travelling mold comprising horizontally separable sections and a tiltable mold bottom, said mold bottom comprising a hump of materially less diameter than the mold cavity and projecting upward into the mold cavity to form a hollow reentrant bottom on the article being formed in the mold, a stationary cam operable to move said bottom vertically relative to the mold, means to separate the mold sections, and a cam traveling with the mold and controlling the tilting of the mold bottom.

30. In a glass forming machine, the combination of a rotatable mold carriage, a mold thereon, a stationary cam, and means for actuating the mold including a sectional rod on the mold carriage operated by said cam, said rod being extensible lengthwise by a relative movement of said sections, coil springs mounted on one of said sections, the other section having a sliding connection with the first section intermediate said springs and operative to compress one spring when the rod is extended and to compress the other spring when the rod is contracted.

31. In a glass forming machine, the combination of a rotatable mold carriage, a mold thereon, a stationary cam, means for actuating the mold including a sectional rod on the mold carriage operated by said cam, said rod being extensible lengthwise by a relative movement of said sections, coil springs mounted on one of said sections, the other section having a sliding connection with the first section intermediate said springs and operative to compress one spring when the rod is extended and to compress the other spring when the rod is contracted, and stops for the springs on the section carrying said springs, said stops being arranged to prevent transmission of pressure by either spring from one section to the other of the rod while the other spring is under compression.

Signed at Toledo, in the county of Lucas and State of Ohio, this 29th day of December, 1925.

ALBERT N. CRAMER.